United States Patent
Ito

(10) Patent No.: US 8,619,893 B2
(45) Date of Patent: Dec. 31, 2013

(54) RECEIVING APPARATUS AND RECEIVING METHOD

(75) Inventor: Akira Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 375 days.

(21) Appl. No.: 13/019,748

(22) Filed: Feb. 2, 2011

(65) Prior Publication Data

US 2011/0200133 A1 Aug. 18, 2011

(30) Foreign Application Priority Data

Feb. 16, 2010 (JP) .................................. 2010-30781

(51) Int. Cl.
- *H04L 27/28* (2006.01)
- *H04L 5/12* (2006.01)
- *H04L 23/02* (2006.01)

(52) U.S. Cl.
USPC ............................ 375/267; 375/261; 375/340

(58) Field of Classification Search
USPC .......................... 375/267, 340, 347, 261, 332
See application file for complete search history.

(56) References Cited

U.S. PATENT DOCUMENTS

| | | | |
|---|---|---|---|
| 2008/0273609 A1* | 11/2008 | Murakami et al. | 375/260 |
| 2009/0103641 A1 | 4/2009 | Masui et al. | |
| 2009/0154335 A1* | 6/2009 | Lee et al. | 370/203 |
| 2010/0008441 A1* | 1/2010 | Murakami et al. | 375/267 |

FOREIGN PATENT DOCUMENTS

JP 2009-100408 A 5/2009

* cited by examiner

*Primary Examiner* — Betsy Deppe
(74) *Attorney, Agent, or Firm* — Fujitsu Patent Center

(57) ABSTRACT

A receiving apparatus includes an inverse matrix multiplying portion which multiplies first and second receiving signal points corresponding to first and second receiving signals by an inverse matrix of a channel matrix based on known signals included in the first and second receiving signals, a first arithmetic portion which determines one or more first sending signal candidate points based on the multiplied first receiving signal points, a second arithmetic portion which determines one or more second sending signal candidate points based on the multiplied second receiving signal points, a determining portion which determines first and second sending signal points, corresponding to first and second sending signals from among the first and second sending signal candidate points so that a total distance based on at least a first distance regarding the first sending signal candidate point and a second distance regarding the second sending signal candidate point satisfies a given condition.

19 Claims, 8 Drawing Sheets

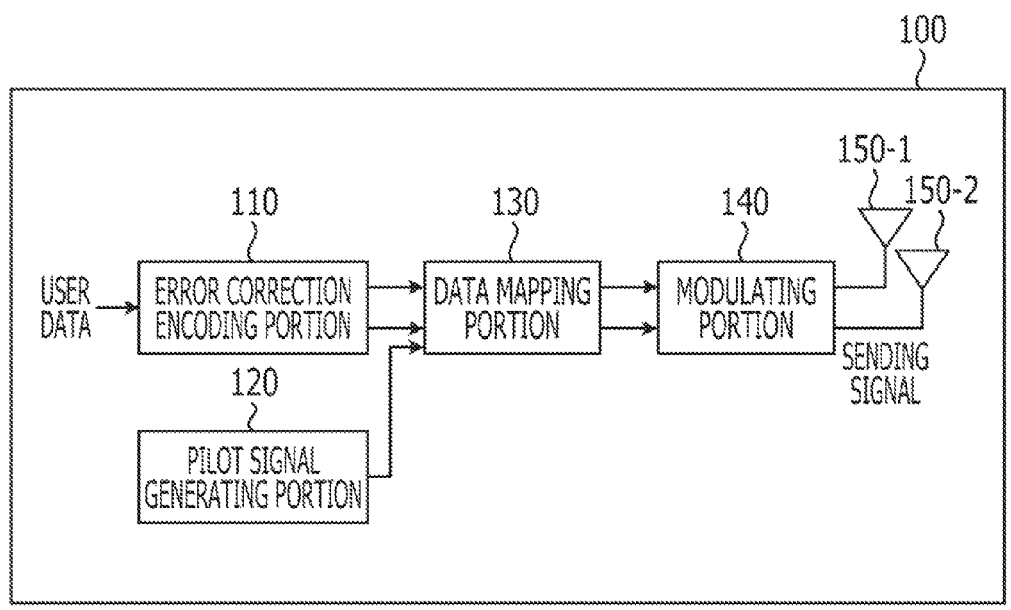
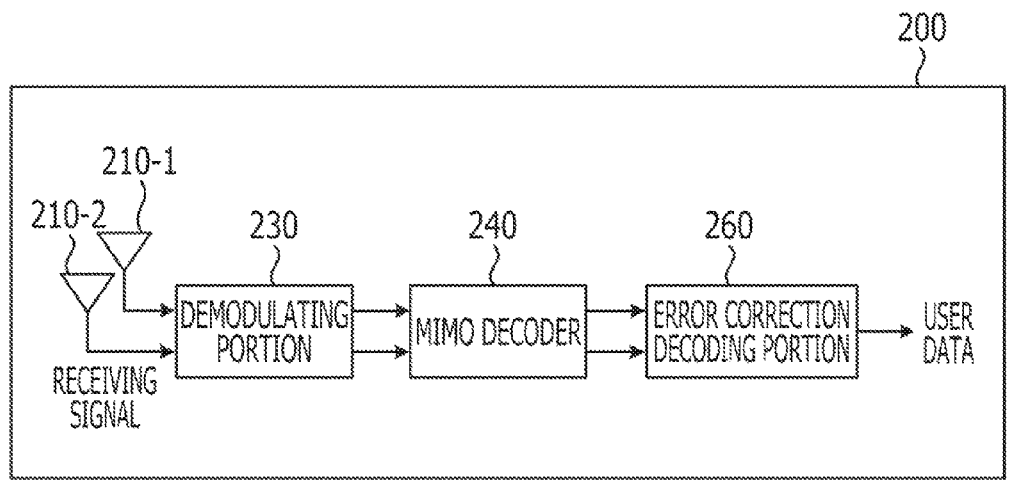

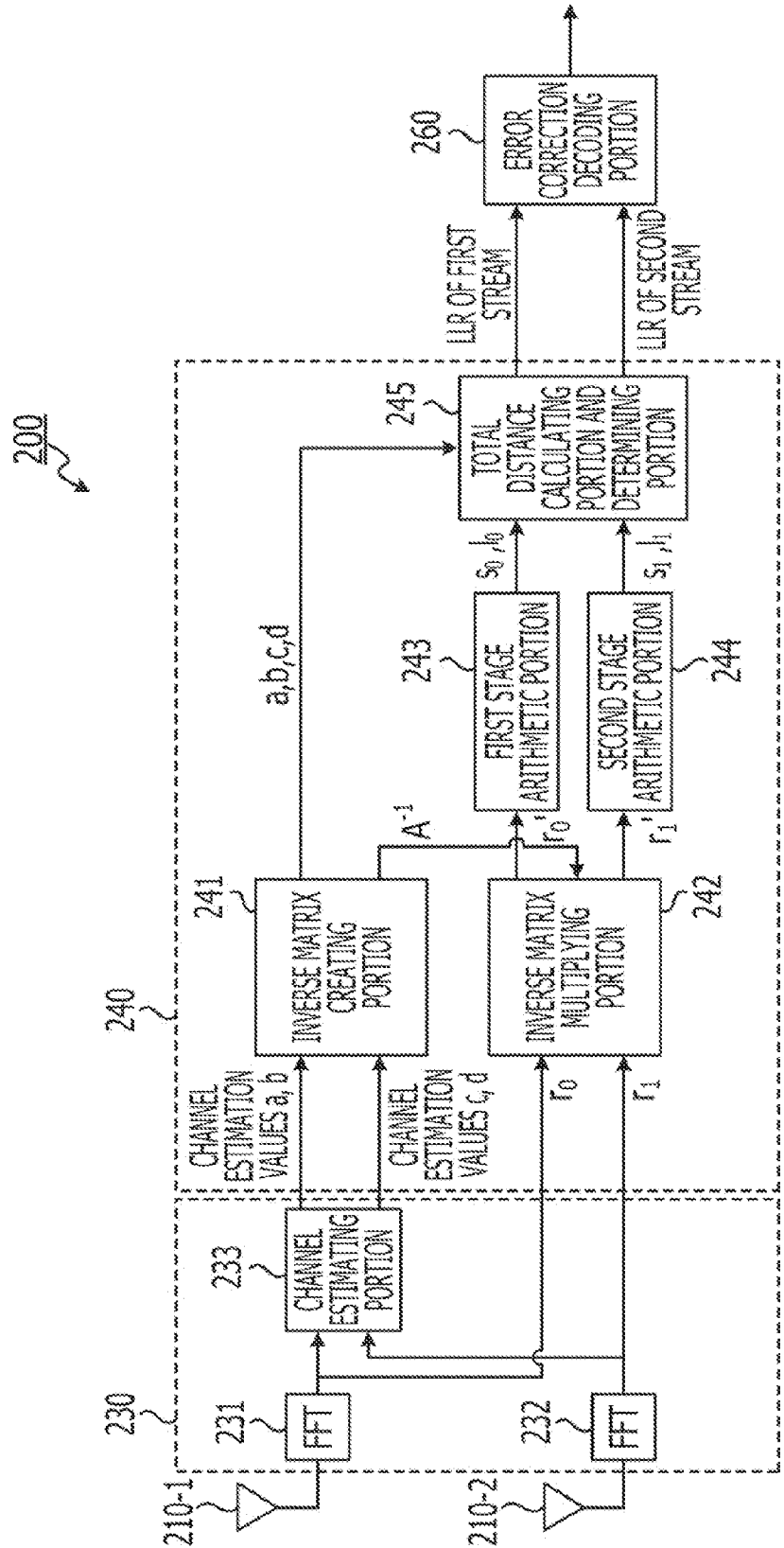

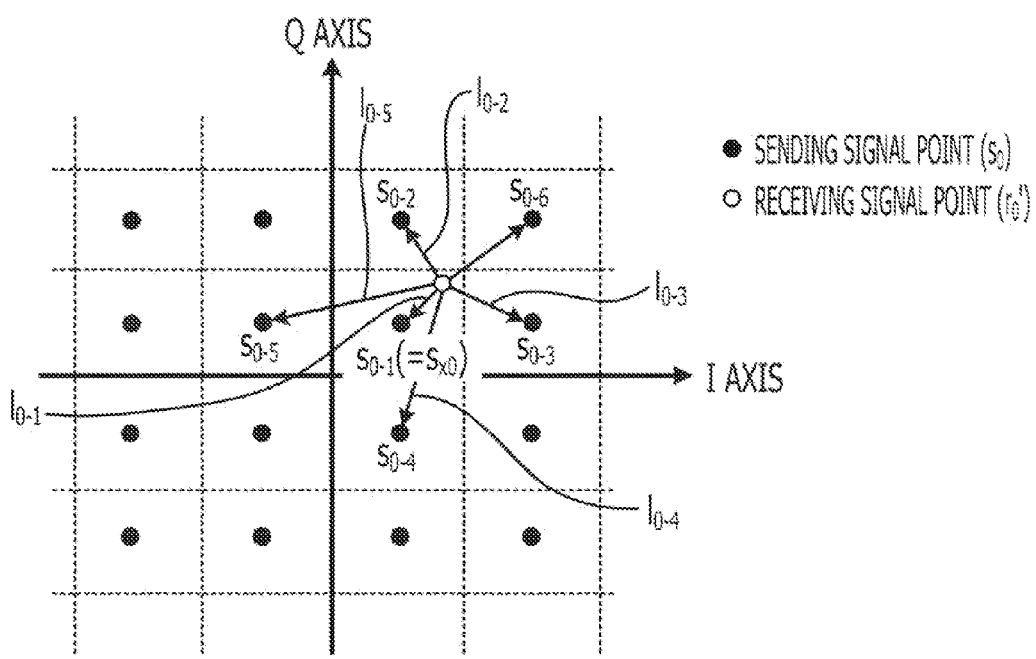

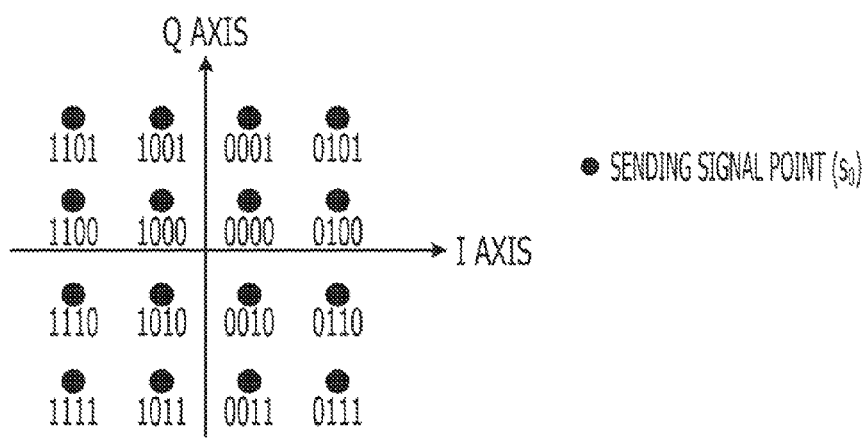
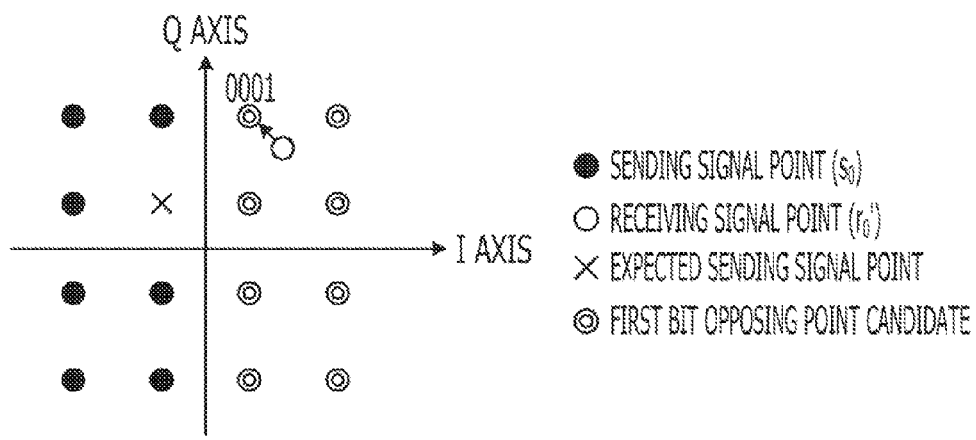

RECEIVING APPARATUS AND RECEIVING METHOD

CROSS-REFERENCE TO RELATED APPLICATION

This application is based upon and claims the benefit of priority of the prior Japanese Patent Application No. 2010-030781, filed on Feb. 16, 2010, the entire contents of which are incorporated herein by reference.

FIELD

Embodiments discussed herein relate to receiving apparatuses and receiving methods.

BACKGROUND

Multiple Input Multiple Output (MIMO) is one form of radio communication. According to MIMO, different signals are sent in parallel from a plurality of sending antennas and are spatially multiplexed, for example, for high-speed transmission.

In a radio communication system based on MIMO, a receiver side performs various detection processing for demultiplexing signals sent from the sending antenna as accurately as possible to detect the sent signals.

Full-Maximum Likelihood Detection (MLD) is one example of the detection processing. In Full-MLD, the distances between a receiving signal point and sending candidate points (or signal replica candidate points) may be acquired to estimate the sending candidate point with the shortest distance as the sending signal point, for example. However, Full-MLD computes distances for all sending candidate points, an enormous amount of computing is required with some number of sending antennas or some modulation methods. Accordingly, sending signal detection processing called QRM-MLD may have been used in the past.

QRM-MLD is a combination of QR decomposition and MLD, for example, and estimates a sending signal point while reducing (or concentrating) the number of sending candidate points. Thus, QRM-MLD requires less amount of computing than Full-MLD. QRM-MLD will be described below.

First of all, a radio communication system based on MIMO may be modeled, for example, as the following Expression (1).

$$y = Hx + n \quad (1)$$

In Expression (1), y is a receiving signal vector, x is a sending signal vector, n is a noise vector, and H is a channel response matrix (or channel matrix). If "2" sending antennas and "2" receiving antennas are available, $$\begin{pmatrix} y_0 \\ y_1 \end{pmatrix} = \begin{pmatrix} a & b \\ c & d \end{pmatrix} \begin{pmatrix} x_0 \\ x_1 \end{pmatrix} + \begin{pmatrix} n_0 \\ n_1 \end{pmatrix} \quad (2)$$

Expression (1) may be expressed as the following Expression (2).

In Expression (2), $y_0$ and $y_1$ are receiving signal points, $x_0$ and $x_1$ are sending signal points (or sending signal candidate points), a, b, c, and d are components of the channel matrix H, and $n_0$ and $n_1$ are components of noise.

Here, the channel matrix H may be decomposed into a unitary matrix Q (whose matrix product with a complex conjugate transposition matrix Q* is equal to a unit matrix) and a higher triangular matrix R and may be expressed as the following Expression (3).

$$H = QR \quad (3)$$

(QR Decomposition).

Multiplying both sides of Expression (2) by the complex conjugate transposition matrix Q* of the unitary matrix Q from the left side, the following Expression (4) may be acquired.

$$Q^*y = Q^*(Hx + n) \quad (4)$$
$$= Q^*Hx + Q^*n$$
$$= Rx + n'$$

Thus, Expression (4) may be expressed as the following Expression (5).

$$\begin{pmatrix} y_0' \\ y_1' \end{pmatrix} = \begin{pmatrix} a' & b' \\ 0 & c' \end{pmatrix} \begin{pmatrix} x_0 \\ x_1 \end{pmatrix} + \begin{pmatrix} n_0' \\ n_1' \end{pmatrix} \quad (5)$$

Here, $y_0'$ and $y_1'$ are points acquired by multiplying receiving signal points $y_0$ and $y_1$ by the unitary matrix Q; a', b', and c' are components of the higher triangular matrix R, and $n_0'$ and $n_1'$ are values acquired by multiplying noise components $n_0$ and $n_1$ by the unitary matrix Q. The components of Expression (5) are:

$$y_0' = a'x_0 + b'x_1 + n_0' \quad \text{Expression (5-1)}$$

$$y_1' = c'x_1 + n_1' \quad \text{Expression (5-2)}$$

QRM-MLD selects candidate points with the lowest noise from the candidate points $x_0$ and $x_1$, that is, $x_0$ and $x_1$ with the lowest result (MLD) of:

$$|y_1' - c'x_1|^2 + |y_0' - a'x_0 - b'x_1|^2 \quad \text{Expression (5-3)}$$

In other words, in a first stage, a plurality of candidate points $x_1$ with $|y_1' - c'x_1|^2$ that is lower than a threshold value are selected, and $|y_1' - c'x_1|^2$ is then calculated. In a second stage, the candidate point $x_0$ with the lowest $|y_0' - a'x_0 - b'x_1|^2$ is selected from a plurality of candidate points $x_1$ selected in the first stage, and $|y_0' - a'x_0 - b'x_1|^2$ is calculated. Finally, the candidate point with the lowest result of Expression (5-3) is selected from the selected candidate points $x_0$ and $x_1$, and the selected candidate point is determined (or estimated) as the sending signal point.

Hitherto, the detection of a sending signal with QRM-MLD includes dividing a channel matrix into a plurality of submatrices and using the inverse matrices of the submatrices for QR decomposition to reduce the amount of processing.

SUMMARY

According to an aspect of the embodiments discussed herein, a receiving apparatus includes an inverse matrix multiplying portion which multiplies first and second receiving signal points corresponding to first and second receiving signals, received by first and second receiving antennas, by an inverse matrix of a channel matrix based on known signals included in the first and second receiving signals to generate converted first and second receiving signal points, a first arithmetic portion which determines one or more first sending signal candidate points based on the converted first receiving signal point, a second arithmetic portion which determines one or more second sending signal candidate points based on the converted second receiving signal point, and a determining portion which determines first and second sending signal points, corresponding to first and second sending signals sent from first and second sending antennas in a sending apparatus, from among the first and second sending signal candidate points so that a total distance based on at least a first distance regarding the first sending signal candidate point and a second distance regarding the second sending signal candidate point satisfies a given condition.

The object and advantages of the embodiments will be realized and attained by at least the elements, features, and combinations particularly pointed out in the claims.

It is to be understood that both the foregoing general description and the following detailed description are exemplary and explanatory and are not restrictive of the embodiments, as claimed.

BRIEF DESCRIPTION OF DRAWINGS

FIG. 2A and FIG. 2B illustrate examples of a sending apparatus and a receiving apparatus, respectively;

FIG. 3 illustrates an example of a receiving apparatus;

FIG. 4 illustrates examples of a receiving signal point and a sending signal point;

FIG. 5A illustrates an example of assignment of bits to sending signal points, and FIG. 5B illustrates examples of a receiving signal point and opposing point candidates;

DESCRIPTION OF EMBODIMENTS

Figure 1:
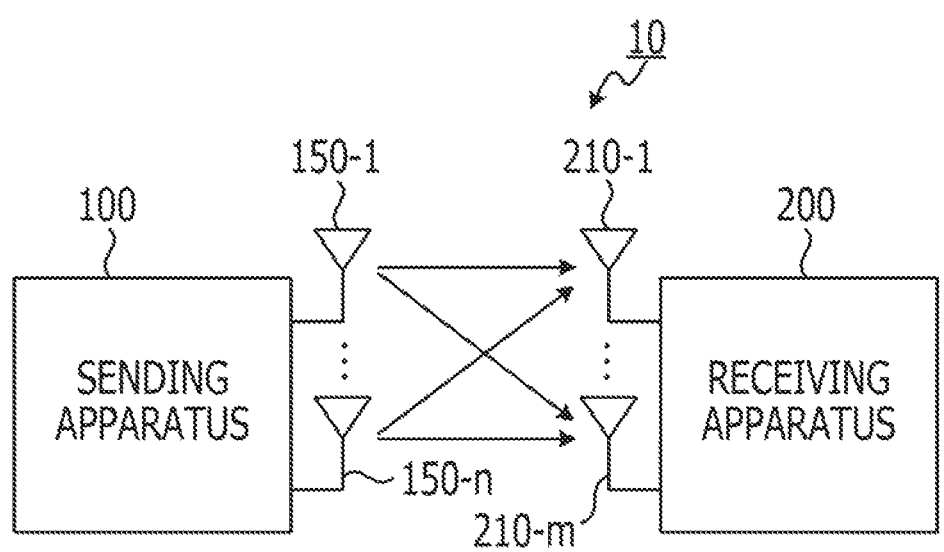
FIG. 1 illustrates an example of a radio communication system.

FIG. 1 illustrates an example of a radio communication system 10. The radio communication system 10 includes a sending apparatus 100 and a receiving apparatus 200.

The sending apparatus 100 is a radio base station apparatus, and the receiving apparatus 200 is a terminal apparatus. However, the sending apparatus 100 may be a terminal apparatus, and the receiving apparatus 200 may be a radio base station apparatus. The sending apparatus 100 includes n (which is a natural number satisfying n≥2) sending antennas 150-1 to 150-$n$, and the receiving apparatus includes m (which is a natural number satisfying m≥2) receiving antennas 210-1 to 210-$m$. The sending apparatus 100 and receiving apparatus 200 use a plurality of sending antennas 150-1 to 150-$n$ and a plurality of receiving antennas 210-1 to 210-$m$ to perform MIMO wireless communication.

Next, examples of the sending apparatus 100 and receiving apparatus 200 will be described. FIG. 2A and FIG. 2B illustrate examples of the sending apparatus 100 and receiving apparatus 200, respectively. In the illustrated examples, there is provided a MIMO radio communication system 10 having "two" (n=2) sending antennas and two (m=2) receiving antennas 210.

The sending apparatus 100 includes an error correction encoding portion 110, a pilot signal generating portion 120, a data mapping portion 130, a modulating portion 140, and sending antennas 150-1 and 150-2 in the first stage and second stage.

The error correction encoding portion 110 performs error correction encoding processing with a given encoding ratio, for example, on user data. The error correction encoding portion 110 outputs encoded user data to the data mapping portion 130 for each of the sending antennas 150-1 and 150-2 in the first stage and second stage.

The pilot signal generating portion 120 generates a pilot signal (or known signal) and outputs it to the data mapping portion 130.

The data mapping portion 130 maps bit streams of the encoded data and pilot signal to sending symbols (such as OFDM symbols).

The modulating portion 140 modulates the sending symbols output from the data mapping portion 130 by a given modulation method. The modulation method may be QPSK (Quadrature Phase Shift Keying), 16-QAM, 64-QAM or the like. The modulating portion 140 performs IFFT (Inverse Fast Fourier Transform) if the radio communication system 10 is an OFDM (Orthogonal Frequency Division Multiplexing) system or performs spreading if the radio communication system 10 is a CDMA (Code Division Multiple Access) system. The case where the radio communication system 10 is an OFDM system will be described below. The modulating portion 140 outputs the sending symbols after IFFT as sending signals to the first and second sending antennas 150-1 and 150-2. From the sending antennas 150-1 and 150-2, different sending signals are sent as radio signals by using the same radio resource.

In the description of operations of this embodiment, a radio signal sent from the first sending antenna 150-1 will be called a first stream, and a radio signal sent from the second sending antenna 150-2 will be called a second stream. Though in a system using pre-coding, which will be described below, the one-to-one correspondence relationship does not exist between the sending antennas 150-1 and 150-2 and the streams, the processing of demultiplexing a stream may be performed by the same operations corresponding to the case with the one-to-one correspondence.

The receiving apparatus 200 includes first and second receiving antennas 210-1 and 210-2, a demodulating portion 230, a MIMO decoder 240, and an error correction decoding portion 260.

The first and second receiving antennas 210-1 and 210-2 receive radio signals sent from the sending apparatus 100 and outputs them as receiving signals to the demodulating portion 230. For example, the first receiving antenna 210-1 receives a first stream sent from the first sending antenna 150-1 and a second stream sent from the second sending antenna 150-2. The second receiving antenna 210-2 also receives a first stream and a second stream.

The demodulating portion 230 performs demodulation processing by a given demodulation method on two receiving signals received from the first and second receiving antennas 210-1 and 210-2. The demodulating portion 230 performs FFT (Fast Fourier Transform) if the system is an OFDM system, like the modulating portion 140 in the sending apparatus 100. The demodulating portion 230 performs back diffusion if the system is a CDMA system. The demodulating portion 230 performs FFT processing on data of the first and second streams to generate data symbols and outputs them to the MIMO decoder 240. The demodulating portion 230 performs FFT processing on a pilot signal of the first and second streams and may perform averaging processing on the signal after the FFT processing to generate a channel estimation value and outputs it to the MIMO decoder 240.

On the basis of the data symbols and channel estimation value, the MIMO decoder 240 acquires an LLR (Logarithm of Likelihood ratio) for bit sequences of the data for each of the first and second streams and outputs them to the error correction decoding portion 260.

The error correction decoding portion 260 decodes and outputs user data on the basis of the LLRs.

FIG. 3 illustrates an example of the receiving apparatus 200 including an example of the MIMO decoder 240. The demodulating portion 230 includes first and second FFT portions 231 and 232 and a channel estimating portion 233.

The first and second FFT portions 231 and 232 perform FFT processing on the receiving signals output from the first and second receiving antennas 210-1 and 210-2. The first and second FFT portions 231 and 232 output the data symbols $r_0$ and $r_1$ (called receiving signal points $r_0$ and $r_1$ hereinafter) after the FFT processing to an inverse matrix multiplying portion 242.

The channel estimating portion 233 receives the input of the pilot signal after the FFT processing of the receiving signals, performs averaging processing thereon as described above and outputs a channel estimation value. The channel estimating portion 233 outputs channel estimation values a and b for the pilot signal included in the first stream, for example, and outputs channel estimation values c and d for the pilot signal included in the second stream.

The MIMO decoder 240 includes, as illustrated in FIG. 3, an inverse matrix creating portion 241, an inverse matrix multiplying portion 242, a first stage arithmetic portion 243, a second stage arithmetic portion 244, a total distance calculating portion, and a determining portion (called a total distance calculating portion hereinafter) 245.

The inverse matrix creating portion 241 acquires an inverse matrix $A^{-1}$ of the channel matrix A on the basis of the channel estimation values a, b, c, and d and outputs it to the inverse matrix multiplying portion 242. The inverse matrix creating portion 241 may acquire the following Expression (6), for example, and compute the following Expression (7).

$$A = \begin{pmatrix} a & b \\ c & d \end{pmatrix} \quad (6)$$

$$A^{-1} = \frac{1}{ad - bc} \begin{pmatrix} d & -b \\ -c & a \end{pmatrix} \quad (7)$$

The inverse matrix multiplying portion 242 multiplies the receiving signal points $r_0$ and $r_1$ after the FFT processing by the inverse matrix $A^{-1}$ of the channel matrix.

In the MIMO radio communication system 10 having "two" sending antennas and "two" receiving antennas, the receiving signal points $r_0$ and $r_1$ received by the first and second receiving antennas 210-1 and 210-2 may be given by the following Expression (8).

$$\begin{pmatrix} r_0 \\ r_1 \end{pmatrix} = \begin{pmatrix} a & b \\ c & d \end{pmatrix} \begin{pmatrix} s_0 \\ s_1 \end{pmatrix} + \begin{pmatrix} n_0 \\ n_1 \end{pmatrix} \quad (8)$$

In Expression (8), $s_0$ and $s_1$ are sending signal points sent from the first and second sending antennas 150-1 and 150-2, and n0 and n1 are noise components received by the first and second receiving antennas 210-1 and 210-2. Multiplying the left side of Expression (8) by the inverse matrix $A^{-1}$ expressed by Expression (7), the following Expression (9) may be acquired.

$$\frac{1}{ad-bc}\begin{pmatrix} dr_0 - br_1 \\ -cr_1 + ar_0 \end{pmatrix} = \begin{pmatrix} s_0 \\ s_1 \end{pmatrix} + \frac{1}{ad-bc}\begin{pmatrix} dn_0 - bn_1 \\ -cn_1 + an_0 \end{pmatrix} \quad (9)$$

Defining as the following Expressions (10), (11), (12) and (13):

$$r'_0 = \frac{dr_0 - br_1}{ad - bc} \quad (10)$$

$$r'_1 = \frac{-cr_1 + ar_0}{ad - bc} \quad (11)$$

$$n'_0 = \frac{dn_0 - bn_1}{ad - bc} \quad (12)$$

$$n'_1 = \frac{-cn_1 + an_0}{ad - bc} \quad (13)$$

Expression (9) may be changed to the following Expression (14).

$$\begin{pmatrix} r'_0 \\ r'_1 \end{pmatrix} = \begin{pmatrix} s_0 \\ s_1 \end{pmatrix} + \begin{pmatrix} n'_0 \\ n'_1 \end{pmatrix} \quad (14)$$

The inverse matrix multiplying portion 242 multiplies the receiving signal points $r_0$ and $r_1$ by the inverse matrix $A^{-1}$, computes to replace them by Expression (10) to Expression (13), and outputs the converted receiving signal points $r_0'$ and $r_1'$ to the first and second stage arithmetic portions 243 and 244, respectively.

The components of Expression (14) are:

$r_0' = s_0 + n_0'$          Expression (14-1)

$r_1' = s_1 + n_1'$          Expression (14-2)

The detection of a sending signal point by QRM-MLD is performed in the second stage by using the candidate points $x_1$ computed in the first stage as expressed by Expression (5-1) and Expression (5-2). However, the receiving apparatus 200 can compute the sending signal point $s_0$ corresponding to the sending signal sent from the first sending antenna 150-1 independently from Expression (14-1) and can compute the sending signal point $s_1$ corresponding to the sending signal sent from the second sending antenna 150-2 independently from Expression (14-2).

In other words, the receiving apparatus 200 can acquire a candidate point with the shortest distance $|r_0'-s_0|^2$ (or $|r_0'-s_0|$), for example, of the sending signal $s_0$ in the first stage arithmetic portion 243 independently from the second stage arithmetic portion 244. The receiving apparatus 200 can acquire a candidate point with the shortest distance $|r_1'-s_1|^2$ (or $|r_1'-s_1|$) of the sending signal $s_1$ in the second stage arithmetic portion 244 independently from the first stage arithmetic portion 243. Thus, the receiving apparatus 200 can process the stages in parallel.

The first stage arithmetic portion 243 determines a candidate point $s_{x0}$. For example, the first stage arithmetic portion 243 determines that the sending signal point $s_0$ with the shortest distance $l_{0-0}$ among the distances $l_0$ ($= |r_0'-s_0|^2$ (or $|r_0'-s_0|$) between the sending signal point $s_0$ and receiving signal point $r_0'$ is the candidate point $s_{x0}$. The first stage arithmetic portion 243 calculates the shortest distance $l_{0-0}$ between the candidate point $s_{x0}$ and the receiving signal point $r_0'$.

A process to determine the candidate point $s_{x0}$ will be described. FIG. 4 illustrates examples of the receiving signal point $r_0'$ and sending signal points $s_{0-x}$ (where x as used herein is an indicator indentifying a specific sending signal point among a plurality of sending signal points) on an IQ plane. In FIG. 4, the horizontal axis indicates the I axis, and the vertical axis indicates the Q axis. Also in FIG. 4, the receiving signal point $r_0'$ is indicated by a white circle, and the sending signal point $s_0$ are indicated by black circles. The sending signal points $s_{0-x}$ are arranged at specified points on the IQ plane in accordance with a modulation method, for example. In the example in FIG. 4, the modulation method is "16-QAM". In the example in FIG. 4, the arrows indicate the distances $l_{O-x}$ (where x as used herein is an indicator identifying a specific distance among a plurality of distances). The first stage arithmetic portion 243 determines the sending signal point with the shortest distance, $s_{0-1}$, as the candidate point $s_{x0}$ of the sending signal.

The candidate point $s_{x0}$ may be determined by an area deciding method, for example. The area deciding method may determine the candidate point $s_{x0}$ in accordance with whether the receiving signal point $r_0'$ is positioned within an area enclosed by the boundaries indicated by the dotted lines in FIG. 4 or not. For example, coordinate positions on the IQ plane of three sending signal point $s_{0-1}$, $s_{0-2}$, and $s_{0-3}$ in FIG. 4 are defined as $(I_{s0-1}, Q_{s0-1})$, $(I_{s0-2}, Q_{s0-2})$, and $(I_{s0-3}, Q_{s0-3})$. The boundaries are arranged at the midpoints between the coordinates. Thus, the area of the sending signal point $s_{0-1}$ covers the range from "0" to "½$(I_{s0-1}+I_{s0-3})$" in the I axis direction and the range from "0" to "½$(Q_{s0-1}+Q_{s0-2})$" in the Q axis direction. If the receiving signal point $r_0'$ is positioned within the area of the sending signal point $s_{0-1}$, the first stage arithmetic portion 243 determines the sending signal point $s_{0-1}$ as the candidate point $s_{x0}$.

The coordinate position of the receiving signal point on the IQ plane depends on the phase and amplitude of a receiving signal. Thus, the first stage arithmetic portion 243 can compute the position on the IQ plane of the receiving signal point $r_0'$ on the basis of the phase and amplitude of the receiving signal. The coordinate position on the IQ plane of the sending signal point $s_0$ is determined by the modulation method, for example. Thus, the first stage arithmetic portion 243 computes the positions and boundaries on the IQ plane regarding the sending signal point $s_0$, holds them, and executes the area deciding method with the computed positions of the receiving signal point $r_0'$ on the IQ plane. In this way, since the receiving apparatus 200 uses the area deciding method and does not acquire the distance between the receiving signal point $r_0'$ and all sending signal points $s_0$, the amount of processing can be less than the case with calculation of all distances.

The shortest distance $l_{0-0}$ between the candidate point $s_{x0}$ and the receiving signal point $r_0'$ may be defined by the following Expression (15).

$$l_{0-0} = \sqrt{(I_{r0'}-I_{s0})^2+(Q_{r0'}-Q_{s0})^2} \quad (15)$$

In Expression (15) the coordinates of the candidate point $s_{x0}$ is $(I_{s0}, Q_{s0})$, and the coordinates of the receiving signal point $r_0'$ is $(I_{r0'}, Q_{r0'})$ for example. The first stage arithmetic portion 243 may use Expression (15) to calculate the shortest distance $l_{0-1}$. The first stage arithmetic portion 243 may output the square of the output distance $l_{0-1}$.

The first stage arithmetic portion 243 may determine a plurality of (such as m) candidate points $s_{x0-1}$, $s_{x0-2}$, ..., and $s_{x0-m}$ regarding the candidate point $s_{x0}$. In this case, the first stage arithmetic portion 243 selects the plurality of candidate point $s_{x0-2}$, ..., and $s_{x0-m}$ in the increasing order of the distance from the first selected candidate point $s_{x0-1}$ with the shortest distance. In the example in FIG. 4, if m=5, the first stage arithmetic portion 243 selects the first selected sending signal point $s_{0-1}(=s_{x0-1})$ and four sending signal points $s_{0-2}$ to $s_{0-5}$ neighboring to the sending signal point $s_{0-1}$ as the candidate point $s_{x0}$. If m=4, the first stage arithmetic portion 243 selects arbitrary three points (such as sending signal points $s_{0-2}$ to $s_{0-4}$) neighboring to the sending signal point $s_{0-1}$.

Furthermore, the first stage arithmetic portion 243, in order to select a plurality of candidate points $s_{x0}$ ($s_{x0-1}$, $s_{x0-2}$, ..., and $s_{x0-m}$), calculates the distances $l_0$ ($l_{0-1}$, $l_{0-2}$, ..., and $l_{0-m}$) between the candidate points $s_{x0}$ and the receiving signal points $r_0'$. For example, the first stage arithmetic portion 243 may use Expression (15) (or $|r_0'-s_0|^2$ (or $|r_0'-s_0|$)) to calculate the distance $l_0$. In this case, the first stage arithmetic portion 243 may change the subscript of Expression (15) to calculate the distances $l_0$ between the candidate points $s_{x0}$ and the receiving signal point $r_0'$.

In this way, the first stage arithmetic portion 243 computes one or a plurality of candidate points $s_{x0}$ and one or a plurality of distances $l_0$ and outputs them to the total distance calculating portion 245.

The second stage arithmetic portion 244, like the first stage arithmetic portion 243, uses the area deciding method to determine a sending signal point $s_{1-1}$ with the shortest distance from the receiving signal point $r_1'$ as a candidate point $s_{x1}$ of the sending signal. The second stage arithmetic portion 244, in order to determine a plurality of candidate points $s_{x1-1}$, $s_{x1-2}$, ..., and $s_{x1-m}$, selects the candidate points $s_{x1-2}$, $s_{x1-3}$, ..., and $s_{x1-m}$ in the increasing order of the distance from the candidate point $s_{x1-1}$ with the shortest distance. The second stage arithmetic portion 244 uses Expression (15) (or $|r_1'-s_1|^2$ (or $|r_1'-s_1|$)) to calculate the distance $l_1$ ($l_{1-1}$ to $l_{1-m}$) between one or a plurality of candidate points $s_{x0}$ ($s_{x0-1}$, $s_{x0-2}$, ..., and $s_{x0-m}$) and the receiving signal point $r_1'$.

In this way, the second stage arithmetic portion 244 outputs one or a plurality of candidate points $s_{x1}$ and one or a plurality of distances $l_1$ to the total distance calculating portion 245.

On the basis of the channel estimation values a, b, c, and d output from the inverse matrix creating portion 241 and the distance $l_0$ (=$l_{0-1}$ to $l_{0-m}$) and $l_1$ (=$l_{1-1}$ to $l_{1-m}$), the total distance calculating portion 245 computes the total distance l by the following Expression (16).

$$L = |al_0 + bl_1|^2 + |cl_0 + dl_1|^2 \quad (16)$$
$$= (|a|^2 + |c|^2)|l_0|^2 + (|b|^2 + |d|^2)|l_1|^2 +$$
$$2\text{Re}\{(a^*b + c^*d)l_0^* l_1\}$$

The total distance calculating portion 245 acquires distances $l_0$ and $l_1$ with the shortest total distance L from the plurality of total distances L1 to Lm which are acquired by Expression (16). The total distance calculating portion 245 then determines the distances $l_0$ and $l_1$ corresponding to the candidate points $s_{x0}$ and $s_{x1}$ as the sending signal points $s_0$ and $s_1$ sent from the first and second sending antennas 150-1 and 150-2.

Expression (16) will be described below. As described above, the receiving signal points $r_0'$ and $r_1'$ are acquired by multiplying the receiving signal points $r_0$ and $r_1$ after the FFT processing by the inverse matrix $A^{-1}$ of the channel matrix A. On the basis of the converted receiving signal points $r_0'$ and $r_1'$, the receiving apparatus 200 acquires the distances $l_0$ and $l_1$, further computes the total distance L, and determines the candidate points $s_{x0}$ and $s_{x1}$.

On the other hand, multiplying the converted receiving signal points $r_0'$ and $r_1'$ by the matrix A results in the conversion to the original receiving signal points $r_0$ and $r_1$. By using this, multiplying the distances $l_0$ and $l_1$ by the matrix A provides the distances between the original receiving signal points $r_0$ and $r_1$ and the candidate points $s_{x0}$ and $s_{x1}$.

Multiplying the distances $l_0$ and $l_1$ by the matrix A provides the following Expression (17).

$$\begin{pmatrix} a & b \\ c & d \end{pmatrix} \begin{pmatrix} l_0 \\ l_1 \end{pmatrix} = \begin{pmatrix} al_0 + bl_1 \\ cl_0 + dl_1 \end{pmatrix} \quad (17)$$

The total distance L is the square of the components of Expression (17) and may be expressed by Expression (16).

Focusing on Expression (16), the first term and the second term are computed by only using the distances $l_0$ and $l_1$ computed in the first and second stage arithmetic portions 243 and 244, respectively. On the other hand, the third term uses both of the distances $l_0$ and $l_1$ computed by the first and second stage arithmetic portions 243 and 244.

The first and second stage arithmetic portions 243 and 244 do not know which distances $l_0$ and $l_1$ can provide the shortest total distance L unless the total distance calculating portion 245 computes Expression (16). On the other hand, the third term of Expression (16) is equal to "0" with any values of the distances $l_0$ and $l_1$ where the coefficient (a*b+c*d) is equal to "0". In this case, the combination between the shortest distance $l_0$ ($=l_{0-1}$) computed by the first stage arithmetic portion 243 and the shortest distance $l_1$ ($=l_{1-1}$) computed by the second stage arithmetic portion 244 can provide the shortest total distance L. In other words, the candidate points $s_{x0}$ and $s_{x1}$ of the sending signals $s_0$ and $s_1$ with the shortest distances in the first and second stage arithmetic portions 243 and 244 can also provide the shortest total distance L and can be determined as the sending signal points $s_0$ and $s_1$ sent from the first and second sending antennas 150-1 and 150-1.

Here, in MLD after the QR decomposition in the detection with QRM-MLD, the second stage is executed on the basis of the execution result of the first stage, which requires more processing time.

In MLD after the QR decomposition, the candidate point $x_0$ with the lowest $|y_0'-a'x_0-b'x_1|^2$ is computed in the second stage. The $|y_0'-a'x_0-b'x_1|^2$ contains a candidate point $x_1$ selected in the first stage. Thus, some candidate points $x_1$ selected in the first stage may largely change the value of $|y_0'-a'x_0-b'x_1|^2$ in the second stage. In other words, among some candidate points $x_1$ that are not selected in the first stage, a candidate point $x_0$ with the lowest result value of $|y_0'-a'x_0-b'x_1|^2$ may exist in the second stage. For that reason, in QRM-MLD, $|y_0'-a'x_0-b'x_1|^2$ may be calculated for all candidate points $x_1$ in the second stage. In this case, for example, the entire amount of processing in the receiving apparatus increases by the amount of processing for the calculation of $|y_0'-a'x_0-b'x_1|^2$ for all candidate points $x_1$.

Furthermore, even when a channel matrix is divided into a plurality of submatrices which are then used for QR decomposition, processing in both of the stages is performed in the MLD after that. Thus, the entire amount of processing may also increase.

In contrast, according to the above-described embodiment, the number of candidates of the sending signal points $s_0$ and $s_1$ may be lower if the coefficient (a*b+c*d) is lower than the threshold value, and the amount of processing can be reduced. Conversely, if the coefficient (a*b+c*d) is higher than the threshold value, the number of candidates is made higher than the given number due to the influence of the third term of Expression (16). Thus, the deterioration of the radio characteristic may be prevented.

On the other hand, the MIMO radio communication system 10 uses a technology called pre-coding or rank adaptation. In pre-coding, on the basis of the communication quality received from a terminal, for example, a radio base station weights and sends the sending signals sent from the sending antennas 150-1 and 150-2. Thus, the first stage stream is sent from both of the antennas 150-1 and 150-2, and the second stage stream is sent from both of the antennas 150-1 and 150-2. The streams are demultiplexed by weighting using the sending antennas. In rank adaptation, on the basis of the communication quality received from a terminal, for example, a radio base station changes the number of streams and sends sending signals.

The sending apparatus 100 sends a sending signal by weighting using pre-coding for easy demultiplexing between the streams. In this case, the receiving antennas 210-1 and 210-2 of the receiving apparatus 200 receive the weighted receiving signals. Thus, the channel estimation values a, b, c, and d are different from those before the weighting, and the coefficient (a*b+c*d) becomes lower than the threshold value. Therefore, the receiving apparatus 200 in the MIMO radio communication system 10 more frequently acquires the third term that is lower than a specified value by the precoding. Therefore, even when the number of candidates in the first stage arithmetic portion 243 and second stage arithmetic portion 244 is lower than the threshold value, the characteristic deterioration can be prevented, and the amount of processing can further be reduced.

If the coefficient (a*b+c*d) acquired from the channel estimation values a, b, c, and d is higher than the threshold value and if the number of streams is higher than the given number, the interference between the streams may deteriorate the radio characteristic. Thus, the number of streams that is lower than the given number can provide a higher radio throughput. In this case, the sending apparatus 100 changes the number of sending streams (or sending antennas to be used) from "2" to "1", for example, by rank adaptation. Since the interference between the streams does not occur, the amount of processing by the receiving apparatus 200 can be significantly lower than the threshold value without performing MIMO signal demultiplexing. In other words, according to this embodiment, in order to reduce the amount of processing, the number of candidates in the first and second stage arithmetic portions 243 and 244 is required to be lower than the threshold value. On the other hand, when the coefficient (a*b+c*d) is higher than the threshold value, it is difficult to lower the number of candidates than the threshold value because of the influence of the third term of Expression (16). However, a system using rank adaptation to increase the radio throughput does not perform MIMO signal demultiplexing when the coefficient (a*b+c*d) is higher than the threshold value. Thus, this embodiment is applicable when the coefficient (a*b+c*d) is lower than the threshold value, that is, when the number of candidates may be lower. In this way, a system using rank adaptation allows a lower number of candidates than the threshold value in the first and second stage arithmetic portions 243 and 244, which can reduce the amount of processing.

As described above, the first and second stage arithmetic portions 243 and 244 compute the distances $l_0$ ($=l_{0-1}$ to $l_{0-5}$) and $l_1$ ($=l_{1-1}$ to $l_{1-5}$) where the number of candidates of the sending signals $s_0$ and $s_1$ is equal to "5". However, the number of candidates may be a number other than "5". When it can be expected that the coefficient (a*b+c*d) of Expression (16) is "0", the number of candidates may be equal to "1" (the shortest distance). The number of candidates may actually be determined in consideration of the execution of pre-coding or rank adaptation and so as to fit in the range that the radio characteristic does not deteriorate or such that the deterioration of the radio characteristic can be within a tolerance on the basis of a result of a simulation, for example.

In this way, the total distance calculating portion 245 substitutes the equal number of distances $l_0$ and $l_1$ to the number of candidates into Expression (16) to compute the total distances L and compares the magnitudes therebetween. The total distance calculating portion 245 then determines the candidate points $s_{x0}$ and $s_{x1}$ corresponding to the shortest distances $l_0$ and $l_1$ as the total distance L. The determined sending signal points $s_0$ and $s_1$ will be called expected sending signal points hereinafter. The receiving apparatus 200 determines the expected sending signal points as sending signal points $s_0$ and $s_1$ corresponding to the sending signals sent from the first and second sending antennas 150-1 and 150-2.

The receiving apparatus 200 determines the expected sending signal points if error correction decoding processing is not performed in the subsequent stage and ends the processing. According to this embodiment, the error correction decoding portion 260 is provided. Therefore, the total distance calculating portion 245 further calculates the LLR required for the error correction decoding processing and outputs it to the error correction decoding portion 260. The LLR of the nth bit of one symbol may be acquired by:

LLR=(the square of the distance between an expected sending signal point and receiving signal point)−(the minimum value of the square of the distance between the point resulting from the inversion of the nth bit of an expected sending signal point and a receiving signal point)    Expression (18-a).

Thus, the total distance calculating portion 245 uses Expression (18-a) to compute the LLR. The first term of Expression (18-a) has already been calculated by Expression (16). The total distance calculating portion 245 further calculates the second term of Expression (18-a). How to acquire the second term of Expression (18-a) will be described.

FIG. 5A to FIG. 7 are diagrams for acquiring the second term. Among them, FIG. 5A illustrates an example of assignment of bits to sending signal points $s_0$ when the modulation method is "16-QAM". The bit assignment is called Gray Mapping. The bit assignment to sending signal points $s_1$ may also be performed in the same manner as FIG. 5A.

FIG. 5B illustrates the search of the minimum value of the distance between the point resulting from the inversion of the first bit of the expected sending signal point and a receiving signal point. The total distance calculating portion 245 acquires sending signal points $s_0$ (indicated by double circles and being the first-bit opposing point candidates) having the bit inverted from the first bit of the determined expected sending signal point (indicated by x in FIG. 5B) at the first bit. The total distance calculating portion 245 searches a candidate point with the shortest distance between the first-bit opposing point candidate and the receiving signal point $r_0'$. In this example in FIG. 5B, the distance to the sending signal point $s_0$ with the assignment bit "0001" is the shortest, and the total distance calculating portion 245 acquires the square of the distance, substitutes it to Expression (18-a), and thus acquires the LLR of the first bit.

Figure 6A:
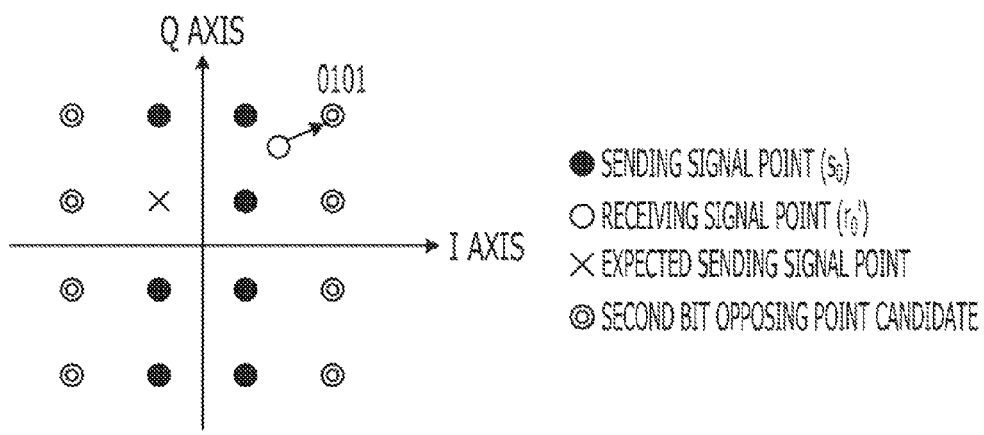
FIGS. 6A and 6B illustrate examples of a receiving signal point and opposing point candidates.

FIG. 6A illustrates the search of the minimum value of the distance between the sending signal points $s_0$ (indicated by double circles in FIG. 6A and being the second bit opposing point candidate) having "1" resulting from the inversion of the second bit "0" of the expected sending signal point at the second bit and a receiving signal point $r_0'$. In this example, since the distance to the second-bit opposing point candidate with the assignment bit "0101" is the shortest, the total distance calculating portion 245 acquires the square of the distance, substitutes it to Expression (18-a) and computes the LLR of the second bit.

Figure 6B:
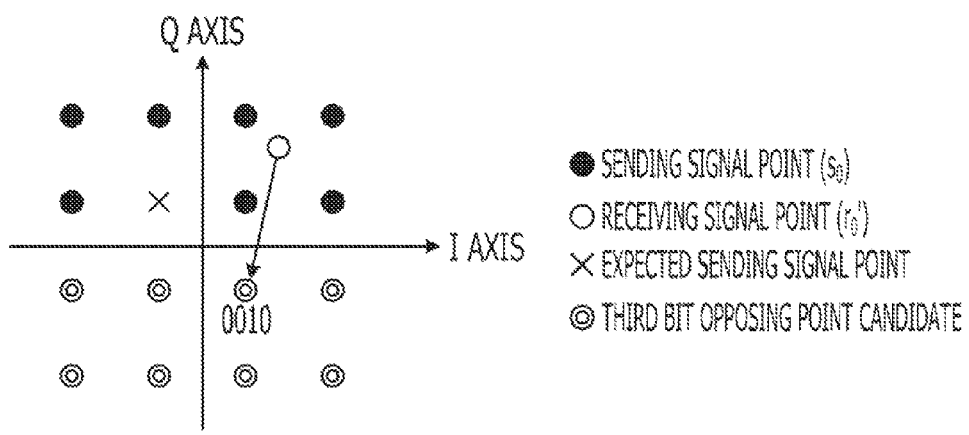
Figure 7:
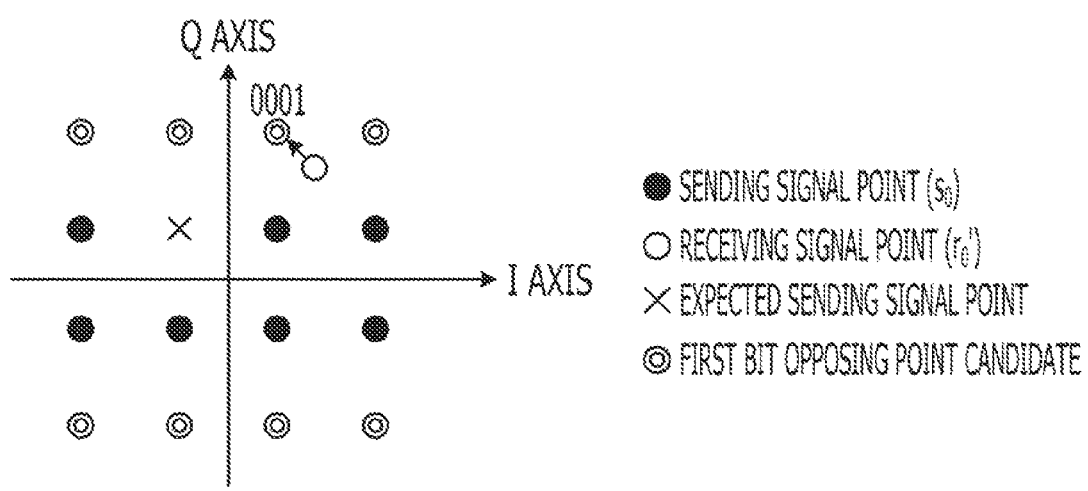
FIG. 7 illustrates examples of a receiving signal point and opposing point candidates.

FIG. 6B illustrates the search of the shortest distance to the third bit, and FIG. 7 illustrates the search of the shortest distance to the fourth bit. In this example, the total distance calculating portion 245 calculates for the third bit the square of the distance between the third-bit opposing point candidate having "0010" at the assignment bit and a receiving signal point $r_0'$ and calculates the LLR of the third bit. The total distance calculating portion 245 further calculates for the fourth bit the square of the distance to the fourth-bit opposing point candidate having "0001" at the assignment bit and calculates the LLR of the fourth bit. The LLRs above are those of expected sending signals for the sending signal point $s_0$. The total distance calculating portion 245 may use Expression (18-a) to calculate the LLR of an expected sending signal point for the sending signal point $s_1$, in the same manner. The total distance calculating portion 245 uses the receiving signal points $r_0'$ and $r_1'$ acquired by multiplying the receiving signal points $r_0$ and $r_1$ by the inverse matrix $A^{-1}$ of the channel matrix A to compute the LLR.

The total distance calculating portion 245 outputs the calculated LLR to the error correction decoding portion 260. The error correction decoding portion 260 uses the LLR being soft-decision information to perform error correction decoding. For example, the error correction decoding portion 260 uses the LLR and refers to the probability of the information bit to decode the user data (information bit).

Figure 8:
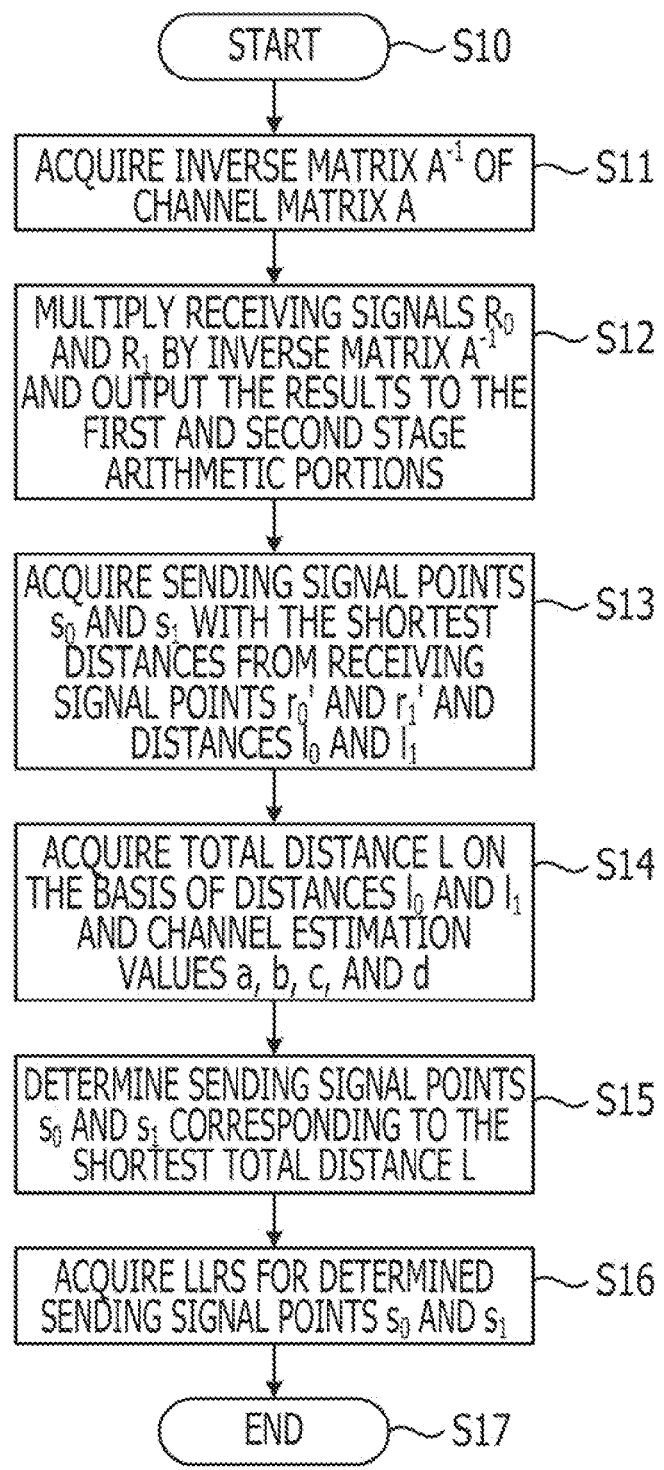
FIG. 8 is a flowchart illustrating operation examples.

FIG. 8 is a flowchart illustrating operation examples in the receiving apparatus 200.

When processing starts (S10), the receiving apparatus 200 computes the inverse matrix $A^{-1}$ of the channel matrix A (S11). For example, the channel estimating portion 233 acquires the channel estimation values a, b, c, and d on the basis of the received pilot signal. The inverse matrix creating portion B241 generates the inverse matrix $A^{-1}$ of the channel matrix A from the channel estimation values a, b, c, and d.

The receiving apparatus 200 multiplies the receiving signals $r_0$ and $r_1$ by the inverse matrix $A^{-1}$ and outputs the results for the corresponding streams to the first and second stage arithmetic portions 243 and 244 (S12). For example, the inverse matrix multiplying portion 242 multiplies the receiving signals $r_0$ and $r_1$ by the inverse matrix $A^{-1}$ generated by the inverse matrix creating portion 241 and outputs the multiplied receiving signals $r_0'$ and $r_1'$ to the first and second stage arithmetic portions 243 and 244.

The receiving apparatus 200 acquires candidate points $s_{x0}$ and $s_{x1}$ with the shortest distance between the sending signal points $s_0$ and $s_1$ and the receiving signal points $r_0'$ and $r_1'$ and further acquires the equal number of distances $l_0$ and $l_1$ to a given number of candidates (S13).

For example, the first stage arithmetic portion 243 may use the area deciding method to select the candidate point $s_{x0}$ with the shortest distance $l_0$ ($=|r_0'-s_0|$). The second stage arithmetic portion 244 may also use the area deciding method to select the candidate point $s_{x1}$ with the shortest distance $l_1$ ($=|r_1'-s_1|$). In order to select a given plurality of candidate points $s_{x0}$ and $s_{x1}$, the first and second stage arithmetic portions 243 and 244 select a plurality of candidate points $s_{x0-2}$, $s_{x0-3}$, . . . , $s_{x0-m}$, $s_{x1-2}$, $s_{x1-3}$, . . . , and $s_{x1-m}$ neighboring to the candidate points $s_{x0-1}$ and $s_{x1-1}$ with the shortest distances. In this case, the first and second stage arithmetic portions 243 and 244 compute the distances $l_0$ ($l_{0-1}, \ldots, l_{0-m}$) and $l_1$ ($l_{1-1}, \ldots, l_{1-5}$) between the candidate points $s_{x0-1}, \ldots,$ and $s_{x0-m}, s_{x1-1}, \ldots,$ and $s_{x1-m}$ and receiving signal points $r_0'$ and $r_1'$.

The receiving apparatus 200 calculates the total distance L on the basis of the distances $l_0$ and $l_1$ and the channel estimation values a, b, c, and d (S14). For example, the total distance calculating portion 245 may substitute the channel estimation values a, b, c, and d and the distances $l_0$ and $l_1$ to Expression (16) to calculate the total distance L.

The receiving apparatus 200 determines as expected sending signal points the sending signal points $s_0$ and $s_1$ with total distance L corresponding to the shortest distances $l_0$ and $l_1$ among a plurality of total distances L1 to Lm (S15). For example, the total distance calculating portion 245 may use Expression (16) to a plurality of total distances L and determines the expected sending signal points.

The receiving apparatus 200 acquires the LLRs for the determined expected sending signal points $s_0$ and $s_1$ (S16). For example, the total distance calculating portion 245 may use Expression (18-a) and the area deciding method to acquire the LLRs corresponding to the expected sending signal points $s_0$ and $s_1$ and outputs them to the error correction decoding portion 260.

In this case, the receiving apparatus 200 can compute two sending signal points $s_0$ and $s_1$ independently by multiplying the receiving signals $r_0$ and $r_1$ by the inverse matrix $A^{-1}$ of the channel matrix A, as indicated by Expression (14-1) and Expression (14-2). Thus, the first and second stage arithmetic portions 243 and 244 can calculate two distances $l_0$ ($=|r_0'-s_0|$) and $l_1$ ($=|r_1'-s_1|$) independently, and the receiving apparatus 200 can perform parallel processing.

Each of the two distances $l_0$ ($=|r_0'-s_0|$) and $l_1$ ($=|r_1'-s_1|$) calculated in the first and second stage arithmetic portions 243 and 244 only includes one of the variables $s_0$ and $s_1$. Thus, the receiving apparatus 200 does not calculate the distance $l_1$ for all sending signal points $s_0$ (or the reverse calculation). Therefore, compared with QRM-MLD which may require calculation of the distance $|y_0'-a'x_0-b'x_1|^2$ for all $x_0$ in the second stage, the receiving apparatus 200 can perform a reduced amount of processing.

Another embodiment will be described. The example has been described in which the number of sending antennas is "2", and the number of receiving antennas is "2". For example, the same is also true for the case where the number of sending antennas is "n", and the number of receiving antennas is "m". In this case, the receiving apparatus 200 includes the equal number of stage arithmetic portions (first stage to nth stage arithmetic portion) to the number of sending streams. The inverse matrix creating portion 241 acquires as the channel matrix A the following Expression (18).

$$A = (a_{ij}) = \begin{pmatrix} a_{11} & a_{12} & \cdots & a_{1n} \\ a_{21} & & & \\ \vdots & & \ddots & \\ a_{m1} & \cdots & & a_{mn} \end{pmatrix} \quad (18)$$

Here, i=1, ..., or m, j=1, ..., or n, and $a_{ij}$ may be the channel estimation value with the ith receiving antenna and the jth sending stream, for example. The "n" is the number of sending streams in this embodiment. The number of sending streams may be lower than the number of sending antennas. Each of the streams is weighted by pre-coding and then is sent from the corresponding sending antenna. A plurality of streams may be multiplexed in some sending antennas. The $a_{ij}$ is a channel estimation value for each stream, and the channel estimation value for each sending antenna may be acquired by addition with weighting.

The inverse matrix creating portion 241 generates the inverse matrix $A^{-1}$ expressed by the following Expression (19).

$$A^{-1} = (A^*A)^{-1}A^* \quad (19)$$

The number m of receiving antennas and the number n of sending streams may have a relationship n<m, for example. This is because, if the number m of receiving antennas is higher than the number n of sending streams, the receiving apparatus 200 can demultiplex the sending streams, and the deterioration of the radio characteristic can be prevented.

The inverse matrix creating portion 241 multiplies an m vector containing m receiving signal points r by n×m matrix acquired by Expression (19) from the left to compute an n vector.

The first and second stage arithmetic portions 243 and 244 acquire the distances l to the sending signal candidate points as the receiving signal points r' after the conversion of the n vector.

The total distance arithmetic portion 243 computes the following Expression (20) to compute the total distance L and determines sending signal candidate point s corresponding to the distance l which is the minimum total distance L as the expected sending signal point $s_0$.

$$L = \sum_i \left( \sum_k (a_{ik} \cdot l_k)^2 \right) \quad (20)$$

Here, the distance between the kth receiving signal point $r_k$ after the conversion and the sending signal candidate point $s_k$ is $l_k$, and the n column vector containing the distance $l_k$ is L'. The total distance arithmetic portion 243 computes the m vector by Expression (20) with the product AL' of the channel matrix A and the n column vector L', and the sum of squares of the components of the m vector is acquired as the total distance L.

The total distance calculating portion 245 uses Expression (18) to compute the LLRs for the expected sending signal points s and outputs them to the error correction decoding portion 260.

A receiving apparatus and a receiving method of the disclosed embodiments may reduce an amount of processing. And the receiving apparatus and the receiving method of the disclosed embodiments may perform reception processes in parallel.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiments have been described in detail, it should be understood that the various changes, substitutions, and alterations could be made hereto without departing from the spirit and scope of the invention.

What is claimed is:
1. A receiving apparatus comprising:
an inverse matrix multiplying portion which multiplies first and second receiving signal points corresponding to first and second receiving signals, respectively, received by first and second receiving antennas, respectively, by an inverse matrix of a channel matrix based on known signals included in the first and second receiving signals to generate converted first and second receiving signal points;

a first arithmetic portion which determines one or more first sending signal candidate points based on the converted first receiving signal point;

a second arithmetic portion which determines one or more second sending signal candidate points based on the converted second receiving signal point; and a determining portion which determines first and second sending signal points, corresponding to first and second sending signals sent from first and second sending antennas in a sending apparatus, from among the first and second sending signal candidate points so that a total distance based on at least a first distance regarding the first sending signal point and a second distance regarding the second sending signal point satisfies a given condition.

2. The receiving apparatus according to claim 1, wherein the first arithmetic portion computes one or more first distances between the determined one or more first sending signal candidate points and the converted first receiving signal point, the second arithmetic portion computes one or more second distances between the determined one or more second sending signal candidate points and the converted second receiving signal point, and the determining portion computes the total distance based on the one or more first and second distances output from the first and second arithmetic portions, respectively, and components of the channel matrix.

3. The receiving apparatus according to claim 2, wherein the first arithmetic portion determines the one or more first sending signal candidate points each with a first distance between the determined one or more first sending signal candidate points and the converted first receiving signal point being the shortest and determines the first sending signal candidate points in increasing length of the first distances from the determined first sending signal candidate points, and the second arithmetic portion determines the one or more second sending signal candidate points each with a second distance between the determined one or more second sending signal candidate points and the converted second receiving signal point being the shortest and determines the second sending signal candidate points in increasing length of the second distances from the determined second sending signal candidate points.

4. The receiving apparatus according to claim 3, wherein the first arithmetic portion determines the first sending signal candidate points as the first sending signal candidate points with the shortest first distances between the determined one or more first sending signal candidate points and the converted first receiving signal point when the converted first receiving signal points are positioned within a given area on an IQ plane of the first sending signal candidate points, and the second arithmetic portion determines the second sending signal candidate points as the second sending signal candidate points with the shortest second distances between the determined one or more second sending signal candidate points and the converted second receiving signal point when the converted second receiving signal points are positioned within a given area on an IQ plane of the second sending signal candidate points.

5. The receiving apparatus according to claim 2, wherein the first arithmetic portion computes a lower number of the first sending signal candidate points and the first distances than a threshold value when the first receiving antenna receives the first receiving signals weighted or when the number of sending signals received by the receiving apparatus changes, and the second arithmetic portion computes a lower number of the second sending signal candidate points and the second distances than a threshold value when the second receiving antenna receives the second receiving signals weighted or when the number of sending signals received by the receiving apparatus changes.

6. The receiving apparatus according to claim 2, wherein the determining portion computes as the total distance from an equation:

$$(|a|^2+|c|^2)|l_0|^2+(|b|^2+|d|^2)|l_1|^2+2Re\{(a^*b+c^*d)l_0^*l_1\}$$

where the first and second distances output from the first and second arithmetic portions are $l_o$ and $l_1$, respectively, the channel estimation values corresponding to the first receiving signal are a and b, and the channel estimation values corresponding to the second receiving signal are c and d, and the determining portion determines as the first and second sending signal points one among the first and one among the second sending signal candidate points, respectively, corresponding to the shortest total distance of one or plurality of total distances computed from the equation based on the respective first and second sending signal candidate points.

7. The receiving apparatus according to claim 1, further comprising:

an inverse matrix creating portion which generates the inverse matrix of the channel matrix based on the known signals included in the first and second receiving signals.

8. The receiving apparatus according to claim 1, further comprising an error correction decoding portion, and wherein the determining portion computes logarithm of likelihood ratios for the first and second sending signal points determined on the basis of the converted first and second receiving signal points, and the error correction decoding portion performs error correction decoding processing based on the logarithm of likelihood ratios.

9. The receiving apparatus according to claim 1, wherein the receiving apparatus is a terminal apparatus when the sending apparatus is a base station apparatus and is a base station apparatus when the sending apparatus is a terminal apparatus.

10. A receiving method used in a receiving apparatus comprising:

multiplying first and second receiving signal points corresponding to first and second receiving signals, respectively, received by first and second receiving antennas, respectively, by an inverse matrix of a channel matrix based on known signals included in the first and second receiving signals to generate converted first and second receiving signal points;

first determining one or more first sending signal candidate points based on the converted first receiving signal point;

second determining one or more second sending signal candidate points based on the converted second receiving signal point; and determining first and second sending signal points corresponding to first and second sending signals sent from first and second sending antennas in a sending apparatus, from among the first and second sending signal candidate points so that a total distance based on at least a first distance regarding the first sending signal point and a second distance regarding the second sending signal point satisfies a given condition.

11. The receiving method according to claim 10, wherein
the first determining computes one or more first distances between the determined one or more first sending signal candidate points and the converted first receiving signal point,
the second determining computes one or more second distances between the determined one or more second sending signal candidate points and the converted second receiving signal point, and
the determining computes the total distance based on the one or more first and second distances and components of the channel matrix.

12. The receiving method according to claim 11, wherein
the first determining computes a lower number of the first sending signal candidate points and the first distances than a threshold value when receiving the first receiving signals weighted or when the number of sending signals received by the receiving apparatus changes, and
the second determining computes a lower number of the second sending signal candidate points and the second distances than a threshold value when receiving the second receiving signals weighted or when the number of sending signals received by the receiving apparatus changes.

13. The receiving method according to claim 11, wherein
the determining computes as the total distance from an equation:

$$(|a|^2+|c|^2)|l_0|^2+(|b|^2+|d|^2)|l_1|^2+2Re\{(a^*b+c^*d)l_0^*l_1\}$$

where the distances output from the first and second arithmetic portions are $l_0$ and $l_1$, respectively, the channel estimation values corresponding to the first receiving signal are a and b, and the channel estimation values corresponding to the second receiving signal are c and d, and the determining determines as the first and second sending signal points one among the first and one among the second sending signal candidate points, respectively, corresponding to the shortest total distance of one or plurality of total distances computed from the equation based on the respective first and second sending signal candidate points.

14. The receiving method according to claim 10, further comprising:
generating the channel matrix based on the known signals included in the first and second receiving signals and further generating the inverse matrix of the channel matrix.

15. The receiving method according to claim 10, wherein
the first determining determines the one or more first sending signal candidate points each with a first distance between the determined one or more first sending signal candidate points and the converted first receiving signal point being the shortest and determines the first sending signal candidate points in increasing length of the first distances from the determined first sending signal candidate points, and
the second determining determines the one or more second sending signal candidate points each with a second distance between the determined one or more second sending signal candidate points and the converted second receiving signal point being the shortest and determines the second sending signal candidate points in increasing length of the second distances from the determined second sending signal candidate points.

16. The receiving method according to claim 15, wherein
the first determining determines the first sending signal candidate points as the first sending signal candidate points with the shortest first distances between the determined one or more first sending signal candidate points and the converted first receiving signal point when the converted first receiving signal points are positioned within a given area on an IQ plane of the first sending signal candidate points, and
the second determining determines the second sending signal candidate points as the second sending signal candidate points with the shortest second distances between the determined one or more second sending signal candidate points and the converted second receiving signal point when the converted second receiving signal points are positioned within a given area on an IQ plane of the second sending signal candidate points.

17. The receiving method according to claim 10, further comprising:
computing logarithm of likelihood ratios for the first and second sending signal points determined based on the converted first and second receiving signal points; and
performing error correction decoding processing based on the logarithm of likelihood ratios.

18. The receiving apparatus according to claim 10, wherein
the receiving apparatus is a terminal apparatus when the sending apparatus is a base station apparatus and is a base station apparatus when the sending apparatus is a terminal apparatus.

19. A radio communication system comprising:
a sending apparatus; and
a receiving apparatus configured to,
multiply first and second receiving signal points corresponding to first and second receiving signals, respectively, received by first and second receiving antennas, respectively, by an inverse matrix of a channel matrix based on known signals included in the first and second receiving signals to generate converted first and second receiving signal points;
determine one or more first sending signal candidate points based on the converted first receiving signal point;
determine one or more second sending signal candidate points based on the converted second receiving signal point; and
determine first and second sending signal points, corresponding to first and second sending signals sent from first and second sending antennas in a sending apparatus, from among the first and second sending signal candidate points so that a total distance based on at least a first distance regarding the first sending signal point and a second distance regarding the second sending candidate point satisfies a given condition.

* * * * *